(12) United States Patent
White

(10) Patent No.: US 8,070,175 B2
(45) Date of Patent: *Dec. 6, 2011

(54) BICYCLE FRAME MANUFACTURE

(76) Inventor: Philip White, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/659,671

(22) Filed: Mar. 16, 2010

(65) Prior Publication Data

US 2010/0230041 A1 Sep. 16, 2010

Related U.S. Application Data

(63) Continuation of application No. 11/512,395, filed on Aug. 30, 2006, now Pat. No. 7,712,758.

(51) Int. Cl.
 *B62K 3/02* (2006.01)
(52) U.S. Cl. .......... 280/274; 280/281.1; 280/288.3

(58) Field of Classification Search ........... 280/281.1, 280/281.3, 283, 274, 275; 156/245
See application file for complete search history.

(56) References Cited

U.S. PATENT DOCUMENTS

| | | | |
|---|---|---|---|
| 5,271,784 A | 12/1993 | Chen et al. | 156/156 |
| 5,857,690 A | 1/1999 | Gueugneaud | |
| 5,876,054 A | 3/1999 | Olson et al. | |
| 6,293,574 B1 | 9/2001 | Storck | |
| 6,994,367 B2 | 2/2006 | Mock et al. | |
| 7,051,564 B2 | 5/2006 | Chang | 72/58 |
| 7,168,726 B2 | 1/2007 | Klein | |
| 2004/0145148 A1 | 7/2004 | Klein | |
| 2005/0035571 A1 | 2/2005 | Huck | 280/281.1 |

*Primary Examiner* — Tony H. Winner

(57) ABSTRACT

A bicycle frame is provided in which the head tube, top tube and down tube are constructed as a single structural unit with the ends of the top tube and down tube left open to allow for ease of molding.

19 Claims, 8 Drawing Sheets

BICYCLE FRAME MANUFACTURE

RELATED APPLICATION

This application is a continuation of U.S. application Ser. No. 11/512,395 filed Aug. 30, 2006 now U.S. Pat. No. 7,712,758 B2, dated May 11, 2010.

FIELD OF THE INVENTION

The present invention relates generally to a bicycle frame and more particularly to a bicycle frame made with a unified front end. More particularly, the invention relates to a bicycle where the head tube, down tube and top tube are molded as a single piece. Furthermore, the end of the top tube and down tube are open to provide access to the inside of the tube during molding.

BACKGROUND OF THE INVENTION

Bicycle frames typically include a number of tubes joined together at their ends to form for example a main frame loop of a head, down, top and seat tubes with tubes for chainstays and seatstays extending rearwardly from the seat tube. Many known constructions provide lug type junction members at each point of connection between the tubes such that the junction member and ends of the tubes overlap. This has the disadvantage of increasing the weight of the frame and giving rise to localized concentration of forces.

Other known constructions mold the entire bike frame as a monocoque construction in a single molding process. Further, other known constructions mold only parts of the frame in a semi-monocoque construction. Monocoque construction and the prior semi-monocoque constructions have the disadvantages of difficulty in execution and high costs.

SUMMARY OF THE INVENTION

To at least partially overcome these disadvantages of previously known devices, the present invention provides a bike frame wherein the down tube, head tube and top tube are constructed as a unitary element.

An object of the present invention is to provide a bicycle frame with improved strength and reduced weight particularly where the top tube and down tube connect to the head tube.

Another object of the invention is to reduce point stresses at the connection points of the top tube and down tube with the head tube.

Another object of the invention is to provide a bicycle frame of a construction that is designed for ease of construction.

In accordance with the present invention, a bicycle frame is provided in which the head tube, top tube and down tube are constructed as a single structural unit with the ends of the top tube and down tube left open to allow for ease of molding. Furthermore, the bicycle may be made of a fibre reinforced composite material.

The inventors of the present invention have appreciated that in use of a bicycle some of the greatest forces applied to the bicycle frame are applied where forces from the front wheel, such as jarring forces from the front wheel engaging a hole in a road way, are transferred from the fork to the head tube and hence to the top tube and down tube. To provide a separate head tube, top tube and down tube which can adequately sustain the forces applied in use requires excessive reinforcement of junctions between separately formed head, top and down tubes. By making the front sub-assembly as a unitary, integrally molded element, the strength of the sub-assembly, especially at the junction of the head tube with the top tube and the down tube can be optimized having regard to its weight and the amount of material used. Providing the front sub-assembly with each of the ends of the top tube and down tube which are spaced from the head tubes open, convenient separate access into the top tube and the down tube is provided which affords ease of access through these tubes to the interior of the head tube as is advantageous for consistent, easy, quality molding of the head tube and junction regions between the head tube and the top tube or down tube. Each of the top tube and down tube is preferably straight or substantially straight to facilitate insertion of the removable cores.

In one aspect, the present invention provides a bicycle frame comprising: a top tube with a front end and a rear end, a head tube with a top end and a lower end, a down tube with a front end and a rear end, a seat tube with a top end and lower end, the front end of the top tube connected to the top end of the head tube, the front end of the down tube connected to the lower end of the head tube, the top tube and down tube diverging away from each another as they extend rearwardly from the head tube, the rear end of the down tube coupled to the lower end of the seat tube, the rear end of the top tube top connected to the top end of the seat tube, the top tube, head tube, down tube and seat tube substantially forming a closed main frame loop, the frame comprises a sub assembly molded simultaneously as a single piece comprising the top tube, the head tube and the down tube with the rear end of the top tube open providing access through the top tube to the top end of the head tube and with the rear end of the down tube open providing access through the down tube to the lower end of the head tube. Such a bicycle frame may have: a pair of chainstays each with a front end and rear end, and a pair of seatstays each with a front end and rear end, the pair of chainstays includes a left chainstay and a right chainstay being on opposite sides of the central plane, and the pair of seatstays include a left seatstay and a right seatstay being on opposite sides of the central plane, the front end of the right chainstay connected to the main frame loop proximate the junction of the seat tube and the bottom tube on a right side of the central plane, the front end of each of the right seatstays connected to the seat tube on a right side sides of the central plane spaced upwardly from the front ends of the chainstays, the rear end of the right chainstay connected to the rear end of the right seat stay on the right side of the central plane rearward of the seat tube, the front end of the left chainstay connected to the main frame loop proximate the junction of the seat tube and the bottom tube on a left side of the central plane, the front end of each of the left seatstays connected to the seat tube on a left side sides of the central plane spaced upwardly from the front ends of the chainstays, the rear end of the left chainstay connected to the rear end of the left seat stay on the left side of the central plane rearward of the seat tube, the right chainstay, the right seatstay, and the seat tube substantially form a closed right rear frame loop, the left chainstay, the left seatstay, and the seat tube substantially form a closed left rear frame loop, the rear ends of the pair of chainstays adapted to support a rear wheel journalled on an axle extending therebetween normal to the central plane.

In a further aspect, the present invention provides a bicycle frame comprising: a top tube with a front end and a rear end, a head tube with a top end and a lower end, a down tube with a front end and a rear end, the front end of the top tube connected to the top end of the head tube, the front end of the down tube connected to the lower end of the head tube, the top tube and down tube diverging away from each another as they extend rearwardly from the head tube, a seat support member on the frame coupled to the rear end of the top tube, a pedal crank journal housing on the frame adapted to receive a pedal axle, the journal housing coupled to the rear end of the down tube, the head tube adapted to be coupled to a pivotable front fork which carries a front wheel and handlebars, the frame comprises a sub assembly molded simultaneously as a single piece comprising the top tube, the head tube and the down tube with the rear end of the top tube open providing access through the top tube to the top end of the head tube and with the rear end of the down tube open providing access through the down tube to the lower end of the head tube.

In still a further aspect, the present invention provides a method of manufacture of a bicycle frame outlined above comprising: molding the sub assembly, manufacturing the remainder of the elements of the frame, and assembling the sub assembly and the remainder of the elements. Such a method may contain steps: wherein the step of molding includes placing a pre-formed hollow element formed of uncured fibre reinforced composite material to form the top tube, head tube and down tube in the mold cavity, placing cores into the hollow element, constraining the hollow element between interior surface of the mold cavity and exterior surfaces of the cores. The cores placed in the hollow element maybe inflatable cores such as an air bladder, solid core with a higher coefficient of thermal expansion than materials used in the construction of the mold, such as silicon or rubber, or self expanding materials such as expanding foam.

BRIEF DESCRIPTION OF THE DRAWINGS

Further aspects and advantages of the invention will become apparent upon reading the following description together with the accompanying drawings in which.

DETAILED DESCRIPTION OF THE PREFERRED EMBODIMENTS

Figure 1:
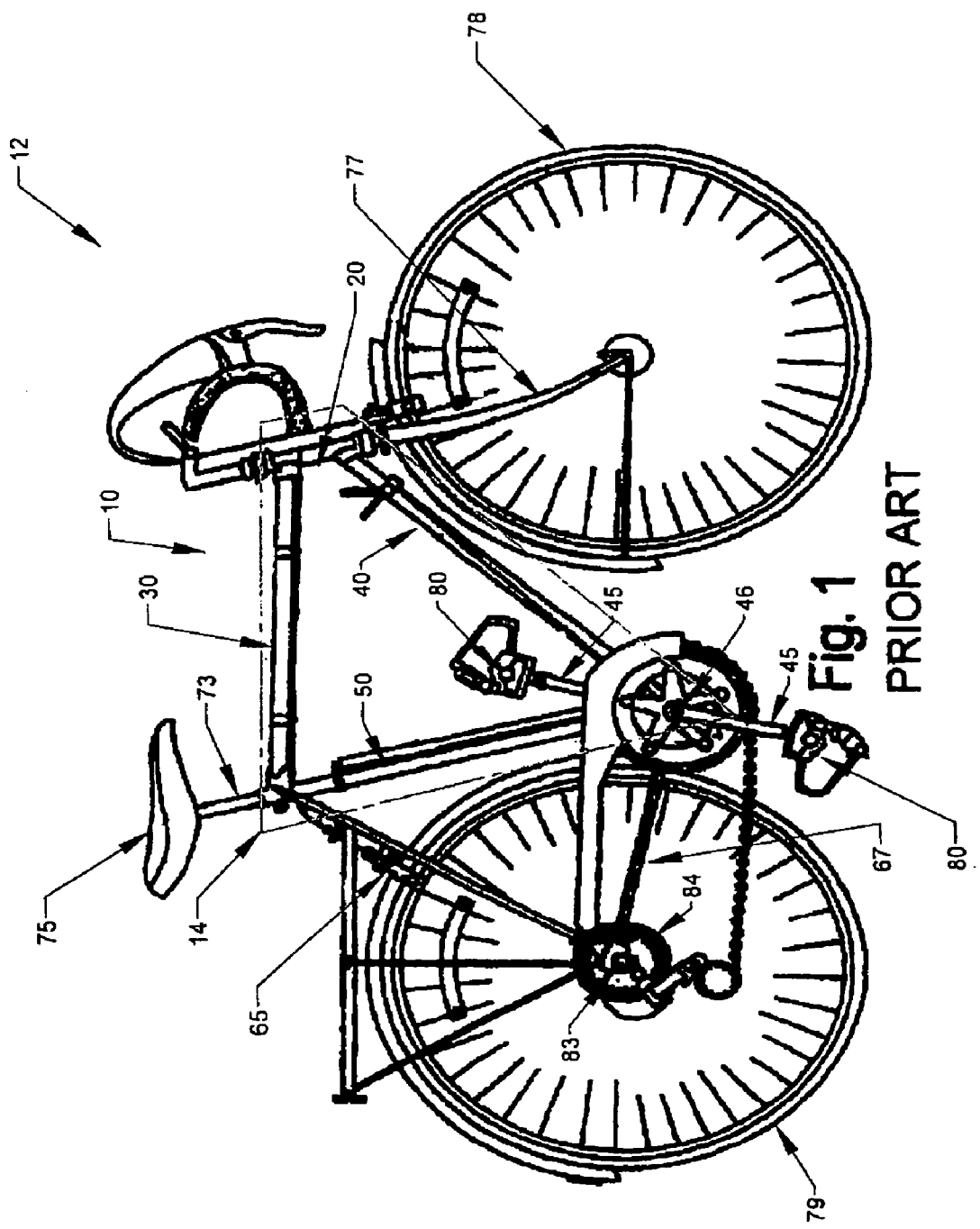
FIG. 1 is a side view of a prior art bicycle.

FIG. 1 is a side view of a prior art bicycle 12. The bicycle 12 has a frame 10 comprising a head tube 20, a top tube 30, a down tube 40 and a seat tube 50. Each of these tubes is connected end-to-end to one another and form substantially a closed main frame loop 14. A seat post 73 is supported by an upper end 51 of the seat tube 50 carrying a seat 75.

A fork 77 is rotatably coupled to the head tube 20 to extend through the head tube carrying at an upper end the handlebars. The fork 77 splits into a pair of arms supporting the front wheel 78. A seatstay 65 and a chainstay 67 extend rearwardly from the seat tube 50 and support a rear wheel 79 journalled on a rear axle 83 extending between the rear ends 84 of the chainstays 67. Two pedals 80 are carried on respective pedal crank arms 45 secured to a pedal axle 46 journalled in a pedal crank journal housing (not shown in FIG. 1) secured proximate the junction of seat tube 50 and down tube 40.

Through all of the drawings the same reference numbers are used to refer to similar elements.

The bicycle frame 10 in accordance with a first embodiment of the invention is shown in FIGS. 2 to 5 and includes a head tube 20, a top tube 30, a down tube 40, a seat tube 30, a right hand chainstay 67, a left hand chainstay 68, a right hand seat stay 65 and a left hand seatstay 66. The head tube 20 has an upper end 21 and a lower end 22. The top tube 30 has a front end 31 and a rear end 32. The down tube has a front end 41 and a rear end 42. The seat tube 50 has an upper end 51 and a lower end 57. The seat tube has an upper tubular portion 52 which has the upper end 51 and a lower end 53; and a lower tubular portion 56 which has an upper end 55 and the lower end 57.

The front end 31 of the top tube 30 is the top end 21 of the head tube 20. The front end 41 of the down tube 40 is connected to the lower end 22 of the head tube 20. The top tube 30 and down tube 40 diverge away from each other as they extend rearwardly from the head tube 20. The rear end 42 of the down tube 40 is coupled to the lower end 57 of the seat tube 50. The rear end 32 of the top tube 30 is connected to the top end 51 of the seat tube 51.

The right hand chainstay 67 has a front end 85 and a rear end 84. The left hand chainstay 68 has a front end 87 and a rear end 86. The right hand seatstay has an upper end 61 and a lower end 62. The left hand seatstay 66 has an upper end 63 and a lower end 62. The front end 85 of the right chainstay 67 is connected to the lower end 57 of the seat tube 50 on a right side thereof. The upper end 61 of the right seatstay 65 is connected to the seat stay 50 spaced upwardly from the front end 85 of the right chainstay 67. The rear end 84 of the right chainstay 67 is connected to the lower end 62 of the right seatstay 65.

The front end 87 of the left chainstay 68 is connected to the lower end 57 of the seat tube 50 on a left side thereof. The upper end 63 of the left seatstay 66 is connected to the seat stay 50 spaced upwardly from the front end 87 of the left chainstay 68. The rear end 86 of the left chainstay 68 is connected to the lower end 64 of the left seatstay 66.

Proximate the juncture between the lower end 57 of the seat tube 50 and the rear end 42 of the down tube 40, a pedal crank journal housing 27 is provided adapted to journal an axle such as the axle 46 for the pedals shown in FIG. 1.

The rear ends 84 and 86 of the chainstays 67 and 68 each carry an axle slotway 71 and 72 adapted to receive a rear axle such as the axle 83 for the rear wheel 79 shown in FIG. 1.

Figure 4:
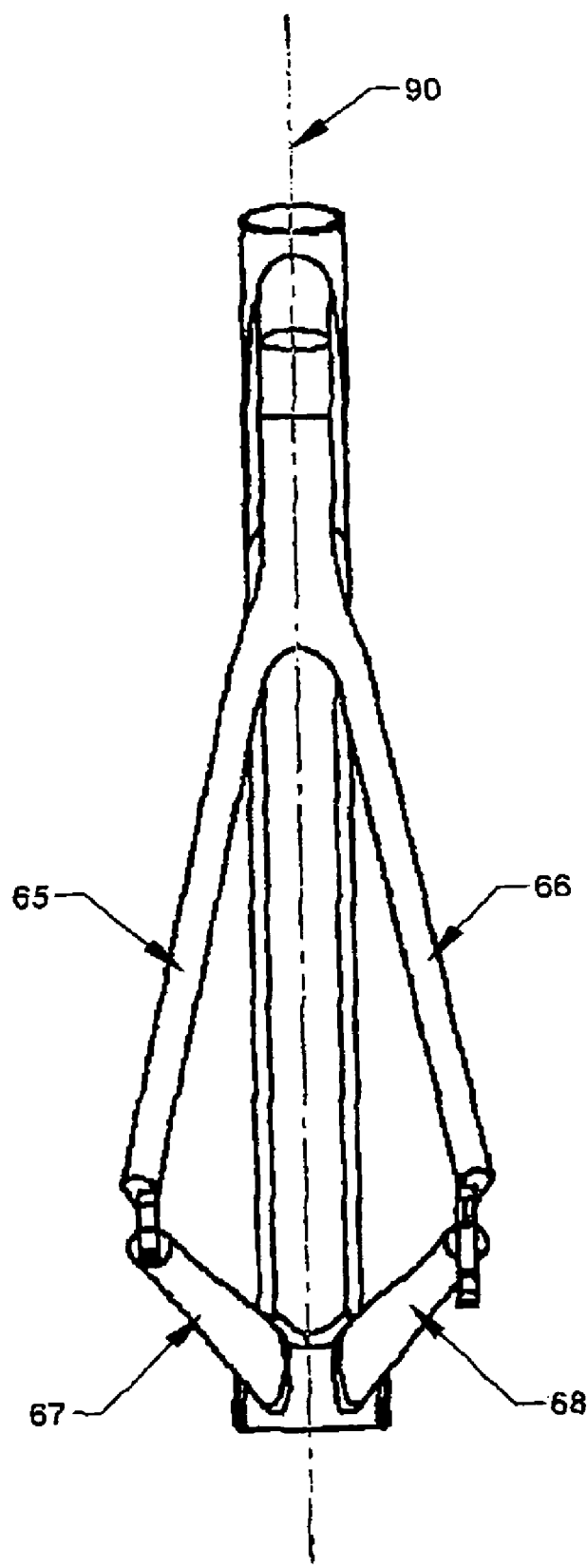
FIG. 4 is a front end view of the bicycle frame of FIG. 2.

The head tube 20, top tube 30, down tube 40 and seat tube 50 form a closed main frame loop indicated as 14 which are disposed to lie with each of its tubes in a flat central plane 90 as seen in FIG. 4. Each of the head tube 20, top tube 30, down tube 40 and seat tube 50 are elongate members disposed about their own longitudinal axis. The longitudinal axis of each of the head tube 20, top tube 30, down tube 40 and seat tube 50 lie in the same flat central plane 90. The right chainstay 67, right seatstay 65 and the seat tube 50 between the front end of the right chainstay 67 and the upper end of the right seatstay 65 form a closed right rear frame loop indicated as 15. The left chainstay 68, left seatstay 66 and the seat tube 50 between the front end of the left chainstay 68 and the upper end of the left seatstay 66 form a closed left rear frame loop indicated as 16. The pair of seatstays is symmetrical of each other about the central plane 92. The pair of chainstays is also symmetrical about each other about the central plane 92.

In a further alternate construction, the seatstays are not symmetrical about the central plane 92 but are on opposite sides of the central plane 92. Furthermore, the chainstays are not symmetrical about the central plane 92 but are on opposite sides of the central plane.

Figure 2:
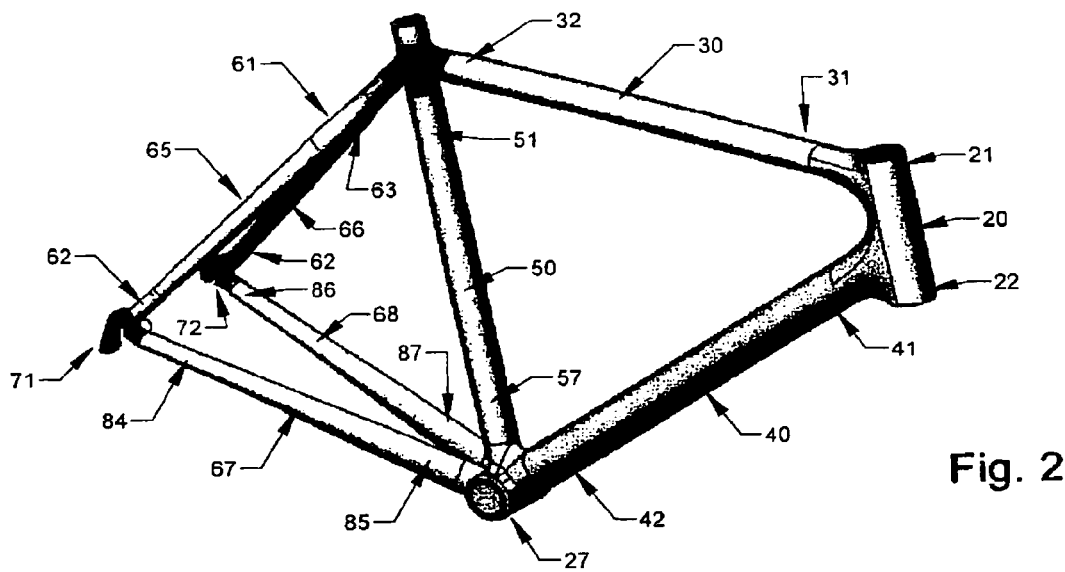
FIG. 2 is a perspective right side view of a bicycle frame in accordance with a first embodiment of the invention.
Figure 3:
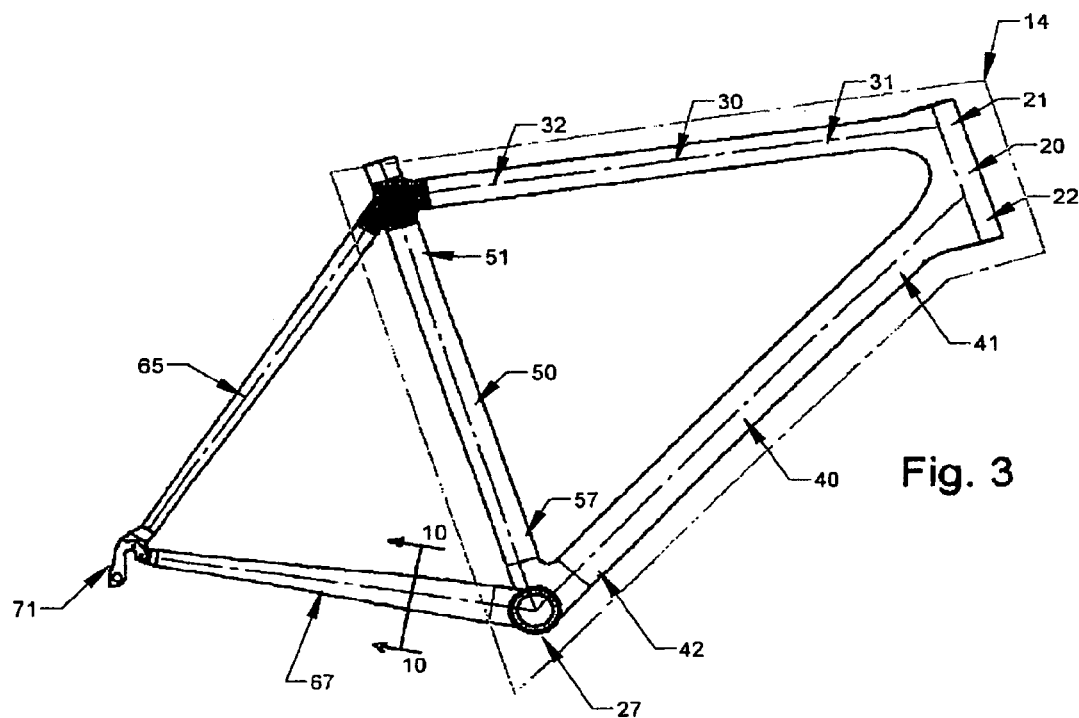
FIG. 3 is a right side view of the bicycle frame of FIG. 2.
Figure 5:
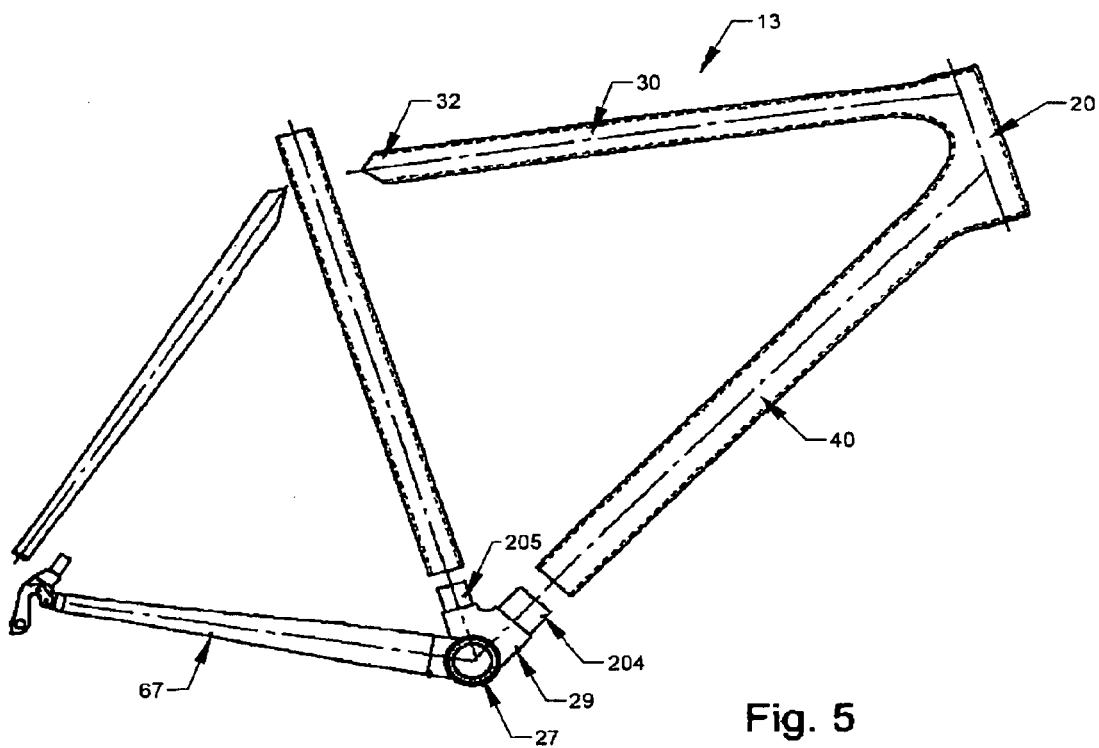
FIG. 5 is an exploded side view of the bicycle frame of FIG. 2.

FIG. 5 is an exploded view of the bicycle frame of FIG. 2 notably showing that the head tube 20, top tube 30 and down tube 40 comprise a unitary element on front sub-assembly 13. The other components of the frame show a pedal crank junction member 29 and the chainstays 67, 68 formed in a unitary construction. The pedal crank junction member 29 carries the pedal crank journal housing 27 and two tenons 204 and 205 adapted to receive the free ends of each of the down tube and seat tube which are to couple thereto. As shown the top tube and seatstays are adapted to connect with the seat tube and are held in place by a wrap construction.

In an alternate embodiment, the pedal crank junction member 29 is not formed in a unitary construction and has tenons adapted to receive the free ends of each of the down tube, seat tube and chainstays. Furthermore, pedal crank junction member 29 could be adapted to receive the free ends of each of the down tube, seat tube and chainstays where each can be connected by anyone of tenons, lugs or wrap construction.

In an alternate embodiment, the seat junction member has three sockets adapted to receive the free ends of each of the top tube, seat tube and seatstays which are to couple thereto. The seat junction member may also be adapted to receive each of the top tube, seat tube and seatstays to be connected by use of tenons, lugs or a wrap construction.

The bicycle frame 10 is made by first manufacturing the front sub-assembly 13 as a unitary element and then coupling the sub-assembly 13 to the remainder of the components of the frame.

The front sub-assembly 13 may be connected to the remainder of the components of the bicycle frame by any construction desired including lug construction with the ends of the tubes fitted over or inside the lugs, in a wrap construction in which ends of the tubes are abutted and are wrapped with reinforcing materials or by use of tenons.

Any two or more of the other components whether as shown in FIG. 5 or otherwise than the front sub-assembly 13 may be made as sub-assemblies or be assembled in advance.

Figure 6:
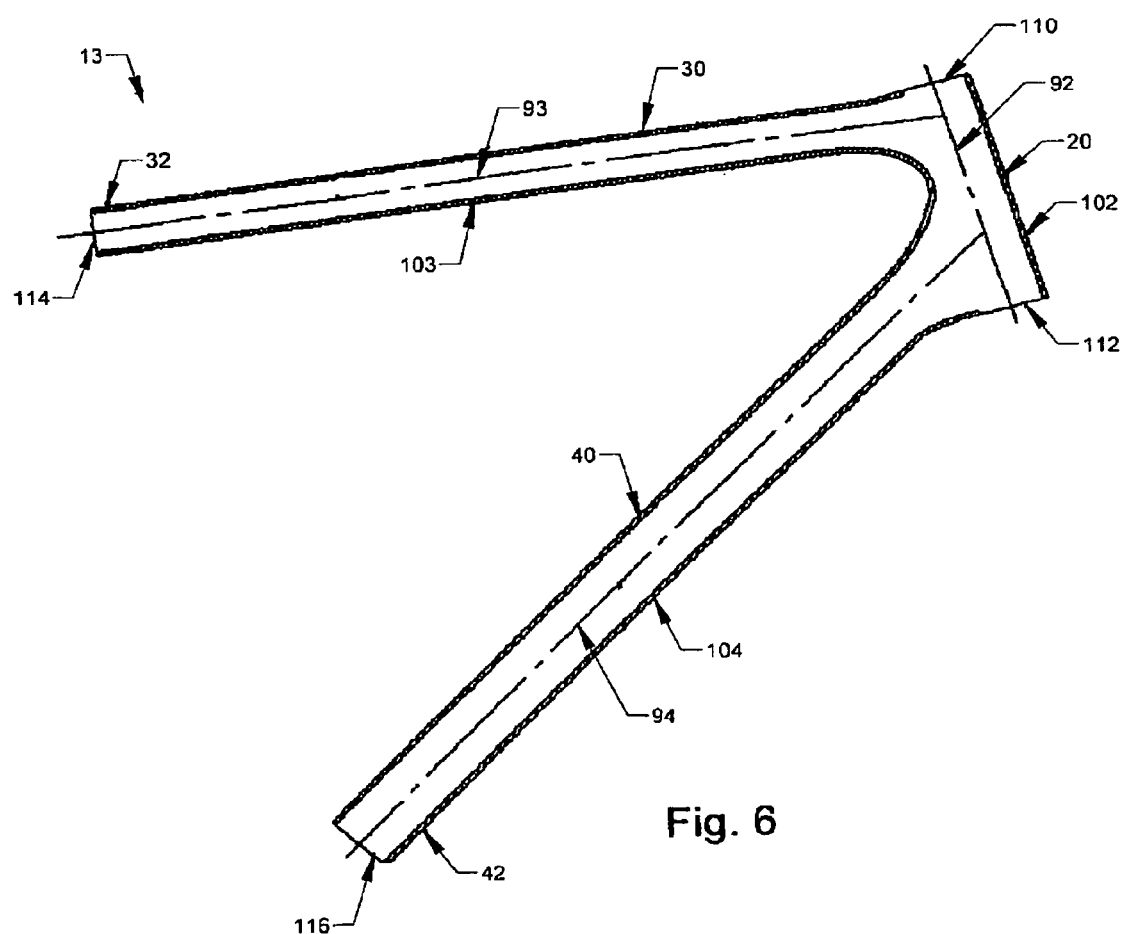
FIG. 6 is a cross-sectional view of the front sub-assembly shown in FIG. 5 along a central plane.

FIG. 6 is a cross section along the central plane through the front sub-assembly 13, that is, through the top tube, head tube and down tube. Each of the tubes comprise a hollow tubular member extending about their own longitudinal axis with the longitudinal axis of 93, 92 and 94, respectively, each of the top tube 30, head tube 20 and down tube 40 lying in the flat longitudinal central plane 90. Each of these tubular members has a circumferential wall 103, 102 and 104, respectively, about their longitudinal axis which circumferential wall is preferably generally symmetrical about the central plane 90. The head tube 20 is shown as having openings 110 and 112 at each of its end about its axis 92 as may be useful with many arrangements for coupling to a fork 77 such as in FIG. 1, but these openings are not necessary.

In the sub-assembly 13, the top tube 30 is open at its rear end 32 as an opening 114 and the down tube 40 is open at its rear end 42 as an opening 116.

Figure 7:
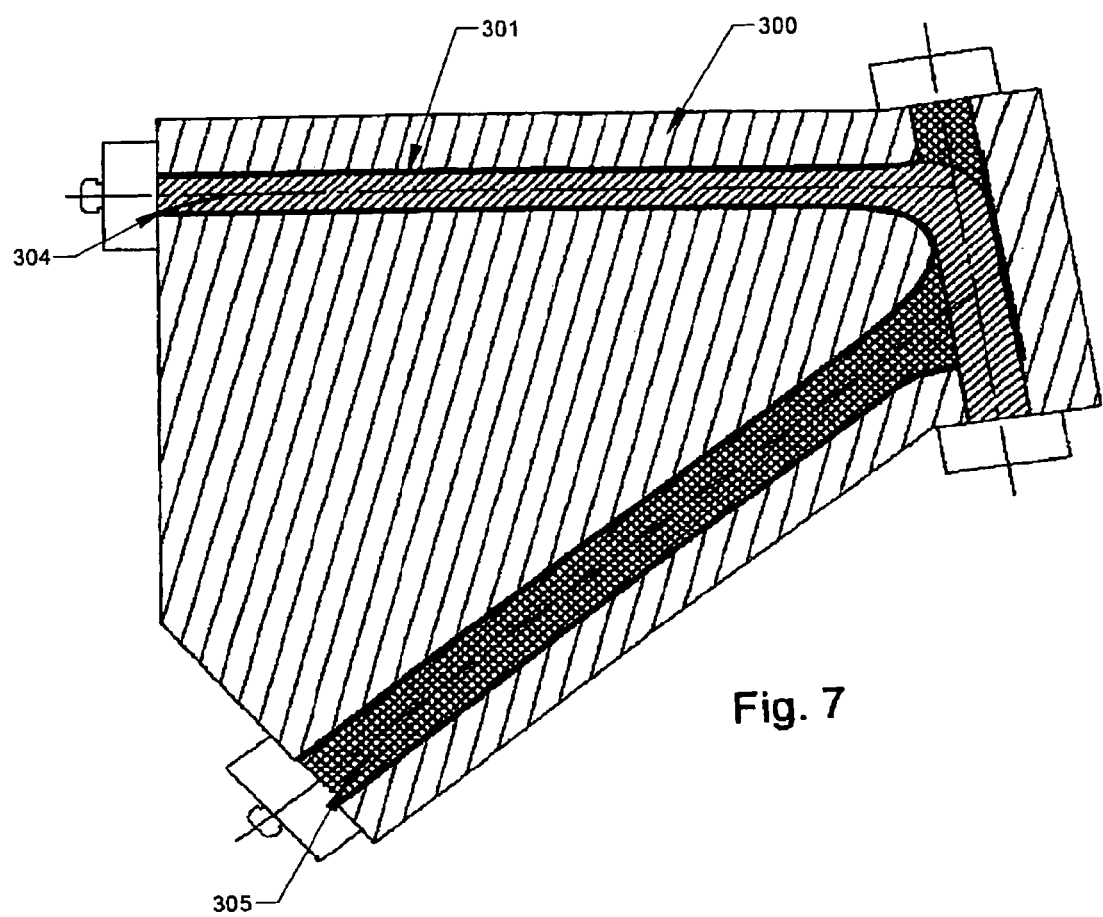
FIG. 7 is a cross-section view of the bicycle frame of FIG. 2 similar to that in FIG. 6 but showing the front sub-assembly as received in a mold during a molding process.

FIG. 7 shows the front sub-assembly 13 in the process of being molded. The sub-assembly 13 is molded in a mold 300 from uncured fibre reinforced composite material such as graphite epoxy by curing the resin by the application of heat when constraining the resin and fibre in the mold. The mold 300 has a mold cavity with an interior surface 301 to engage the outside surfaces of the sub-assembly 13 and with inflatable cores 304, 305 removably located inside the hollow interior of the sub-assembly 13 to engage the inside surfaces of the sub-assembly 13.

As seen in FIG. 7, one inflatable core 304 is located inside the top tube 30 extending longitudinally inside the top tube 30 from its open end 114 to opening 112. With the top tube 30 being generally straight insertion, position and removal of the core 304 is readily permitted which is particularly advantageous to provide for ease of and advantageous location of the core 304 in the junction between the top tube and the head tube. One inflatable core 305 in located inside the down tube 40 extending longitudinally inside the down tube 40 from its open end 116 to opening 110. With the down tube 40 being generally straight insertion, positioning and removal of the core 305 is readily permitted which is particularly advantageous to provide for ease of and advantageous location of the core 305 in the junction between the down tube and the head tube.

The bicycle frame may be made by molding the front sub-assembly 13 as a unitary element, manufacturing the remainder of the components of the frame, and assembling the front sub-assembly 13 and the remainder of the elements. The sub-assembly 13 is preferably made by placing a preformed hollow element formed of uncured fibre reinforced composite material such as graphite epoxy to form the top tube, head tube and down tube in the mold cavity, placing the inflatable cores into the hollow element, constraining the hollow element between the interior surface of the wall cavity and the exterior surface of the inflatable cores while curing the resin by application of heat.

In an alternative configuration, a solid core may be used instead of the inflatable core. The solid core is manufactured from a material with a higher coefficient of thermal expansion than the materials used in construction of the mold. Examples of such are silicon and rubber.

In another configuration, a core manufactured from a material which self expands, such as expanding foam, is used instead of the inflatable cores.

The cores themselves are designed to compact the frame material in the mold. Through the expansion of the cores, the cores compact the uncured fibre reinforced composite material against the interior surface of the cavity of the mold.

By manufacturing the sub-assembly with two open ends at the open ends of the top tube and down tube, increased compaction and increased control of the position of the layers of material can be obtained. The open ends provide better access for easier and more simplified routing of cores which further creates a stronger frame sub-assembly.

The open ends further reduce the associated costs of manufacturing by not only creating a simplified process but by also reducing the size and costs of the associated tools.

Figure 8:
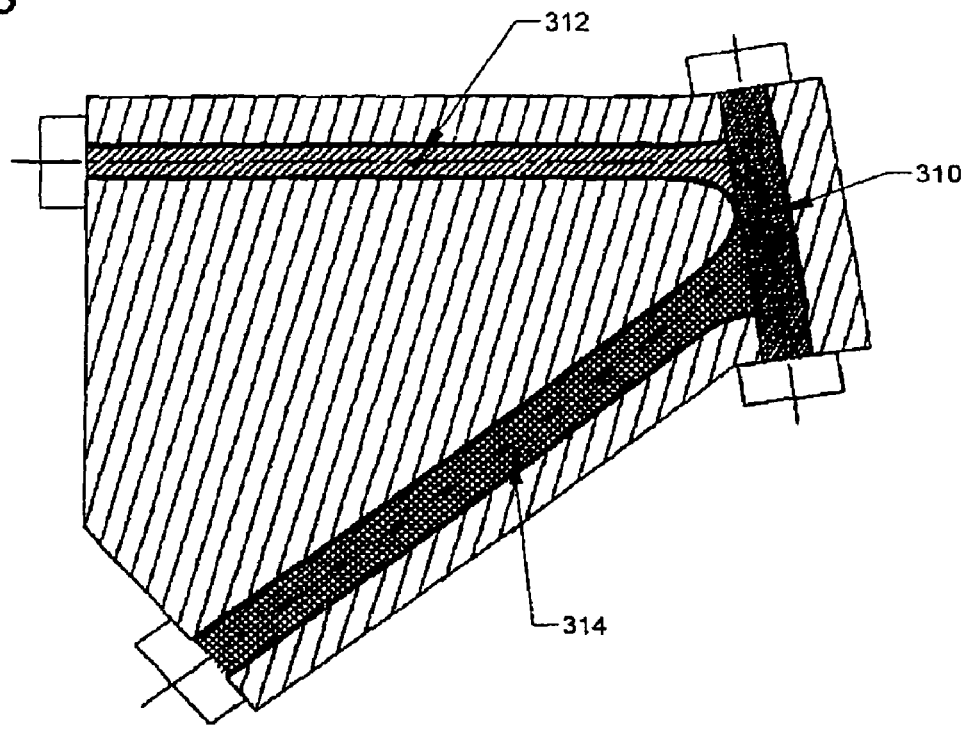
FIG. 8 is a cross-section view of the bicycle frame of FIG. 2 similar to that in FIG. 6 but showing the front sub-assembly as received in a mold during a second molding process

FIG. 8 illustrates an alternate molding method where the mold 300 has a mold cavity with an interior surface 301 to engage the outside surfaces of the sub-assembly 13 and three cores 310, 312 and 314 removably located inside the hollow interior of the sub-assembly 13 to engage the inside surfaces of the sub-assembly. As seen in FIG. 8, one core 310 is located inside the head tube 20 extending from open end 110 to open end 112. In this embodiment the core 310 is substantially straight. One core 312 is located in the top tube and core 314 is located in the down tube.

Figure 9:
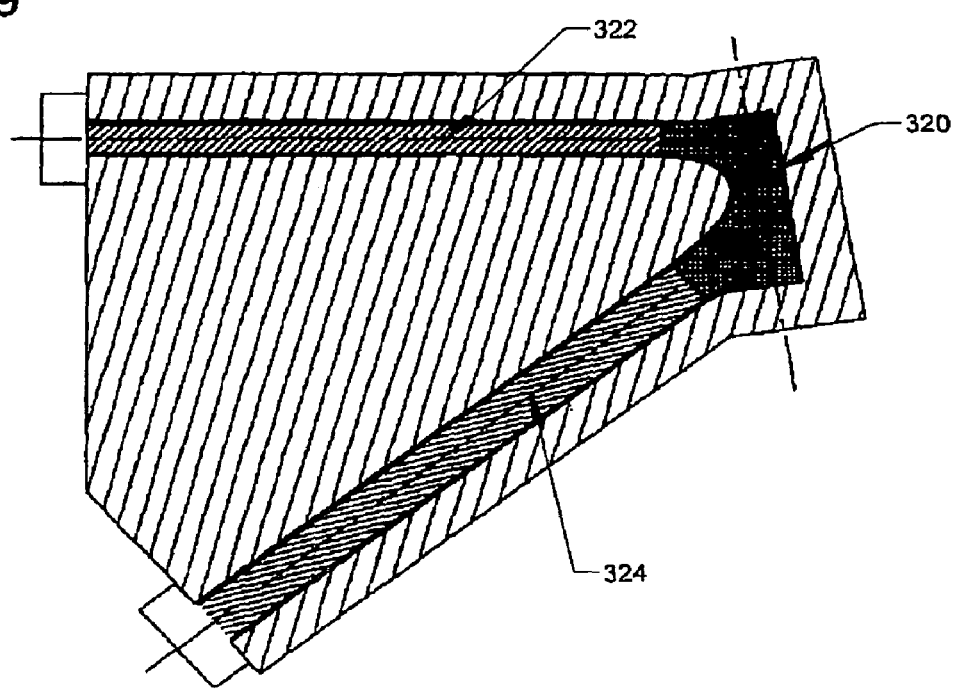
FIG. 9 is a cross-section view of the bicycle frame of FIG. 2 similar to that in FIG. 6 but showing the front sub-assembly as received in a mold during a third molding process
Figure 10:
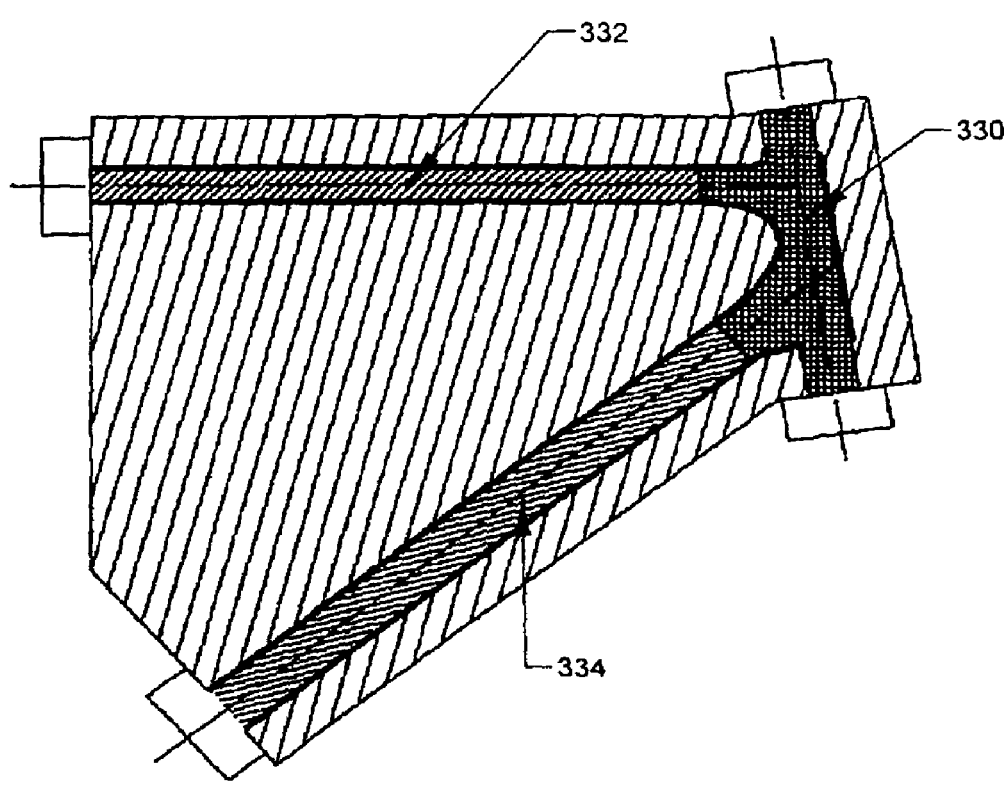
FIG. 10 is a cross-section view of the bicycle frame of FIG. 2 similar to that in FIG. 6 but showing the front sub-assembly as received in a mold during a fourth molding process

FIG. 9 illustrates an alternate molding method where the mold 300 has a mold cavity with an interior surface 301 to engage the outside surfaces of the sub-assembly 13 and two cores 322 and 324 removably located inside the hollow interior of the sub-assembly 13 to engage the inside surfaces of the sub-assembly. Further, as seen in FIG. 9, one core 320 is located inside the head tube 20 extending from open end 110 to open end 112. In this embodiment the core 320 extends into the front end 31 of the top tube 30 and into the front end 41 of the down tube 40. One core 312 is located in the top tube and core 314 is located in the down tube.

FIG. 9 illustrates an alternate molding method where the mold 300 has a mold cavity with an interior surface 301 to engage the outside surfaces of the sub-assembly 13 and three cores 330, 332 and 334 removably located inside the hollow interior of the sub-assembly 13 to engage the inside surfaces of the sub-assembly. As seen in FIG. 9, one core 320 is located inside the head tube 20 extending from open end 110 to open end 112. In this embodiment the core 320 extends into the front end 31 of the top tube 30 and into the front end 41 of the down tube 40. One core 312 is located in the top tube and core 314 is located in the down tube.

While the invention will be described in conjunction with the illustrated embodiments, it is understood that it is not intended to limit the invention to such embodiments. On the contrary, it is intended to cover all alternatives, modifications and equivalents as may be included within the spirit and scope of the invention as defined by the following claims.

The embodiments of the invention in which an exclusive property or privilege is claimed are defined as follows:

1. A method of manufacture of a bicycle frame with
   a top tube with a front end and a rear end,
   a head tube with a top end and a lower end,
   a down tube with a front end and a rear end,
   a seat tube with a top end and lower end,
   the front end of the top tube connected to the top end of the head tube,
   the front end of the down tube connected to the lower end of the head tube,
   the top tube and down tube diverging away from each another as they extend rearwardly from the head tube,
   the rear end of the down tube coupled to the lower end of the seat tube,
   the rear end of the top tube top connected to the top end of the seat tube,
   the top tube, head tube, down tube and seat tube substantially forming a closed main frame loop,
   the frame comprises a sub assembly molded simultaneously as a single piece comprising the top tube, the head tube and the down tube with the rear end of the top tube open providing access through the top tube to the top end of the head tube and with the rear end of the down tube open providing access through the down tube to the lower end of the head tube,
   the method comprising:
   molding the sub assembly,
   manufacturing the remainder of the elements of the frame, and assembling the sub assembly and the remainder of the elements.

2. The method of claim 1 wherein the step of molding includes placing a preformed hollow element formed of uncured fibres reinforced composite materials to form the top tube, head tube and down tube in the mold cavity, placing the cores into the hollow element, constraining the hollow element between interior surface of the mold cavity and exterior surfaces of the cores while curing the resin by the application of heat.

3. The method of claim 2 wherein the cores are inflatable cores.

4. The method of claim 2 wherein the cores are solid cores with higher coefficients of thermal expansion than materials used in construction of the mold.

5. The method of claim 4 wherein the solid core is silicon.

6. The method of claim 4 wherein the solid core is rubber.

7. The method of claim 2 wherein the solid core is a material that self expands.

8. The method of claim 7 wherein the material is expanding foam.

9. The method of claim 1 wherein the step of molding includes placing a preformed hollow element formed of uncured fibres reinforced composite materials to form the top tube, head tube and down tube in the mold cavity, placing the cores into the hollow element, constraining the hollow element between interior surface of the mold cavity and exterior surfaces of the cores while curing the resin by the application of heat.

10. The method of claim 9 wherein the cores are inflatable cores.

11. The method of claim 9 wherein the cores are solid cores with higher coefficients of thermal expansion than materials used in construction of the mold.

12. The method of claim 11 wherein the solid core is silicon.

13. The method of claim 11 wherein the solid core is rubber.

14. The method of claim 9 wherein the solid core is a material that self expands.

15. The method of claim 14 wherein the material is expanding foam.

16. A method of manufacture of a bicycle frame with
    a top tube with a front end and a rear end,
    a head tube with a top end and a lower end,
    a down tube with a front end and a rear end,
    a seat tube with a top end and lower end,
    the front end of the top tube connected to the top end of the head tube,
    the front end of the down tube connected to the lower end of the head tube,
    the top tube and down tube diverging away from each other and extend rearwardly from the head tube,
    the rear end of the down tube coupled to the lower end of the seat tube,
    the rear end of the top tube top connected to the top end of the seat tube,
    the top tube, head tube, down tube and seat tube substantially forming a closed main frame loop,
    the frame comprises a sub assembly molded simultaneously as a single piece comprising the top tube, the head tube and the down tube with the rear end of the top tube open providing access through the top tube to the top end of the head tube and with the rear end of the down tube open providing access through the down tube to the lower end of the head tube;
    wherein the sub assembly is molded with a first core extending via the open top end of the head tube into the interior of the head tube and out the lower end of the head tube, a removable second core extending via the open rear end of the top tube into the interior of the top tube and to the front end of the top tube and with a removable third core extending via the open rear end of the down tube into the interior of the down tube and to the front end of the down tube, the method comprising:
    molding the sub assembly,
    manufacturing the remainder of the elements of the frame, and assembling the sub assembly and the remainder of the elements.

17. The method of claim 16 wherein the first core is removable.

18. The method of claim 17 wherein the first core extends into the front end of the top tube and the front end of the down tube.

19. The method of claim 16 wherein the first core extends into the front end of the top tube and the front end of the down tube.

* * * * *